United States Patent Office 3,547,868
Patented Dec. 15, 1970

3,547,868
PHENOL-MODIFIED UREA-FORMALDEHYDE RESINS AND METHOD OF MAKING SAME
Frederick Schwartzenburg, Jr., and Donald B. Griffin, Tuscaloosa, Ala., assignors to Reichhold Chemicals, Inc., White Plains, N.Y.
No Drawing. Continuation of application Ser. No. 712,385, Mar. 12, 1968. This application Dec. 2, 1969, Ser. No. 876,197
Int. Cl. C08g 9/10, 9/32
U.S. Cl. 260—29.3
8 Claims

ABSTRACT OF THE DISCLOSURE

This invention discloses a method of condensing urea and formaldehyde at a molar ratio of about 1.7–2.5 mols of formaldehyde per one mol of urea, and resultant product. Said method is improved by the addition of a phenolic compound before the final polymerization is obtained. The molar ratio of the phenolic compound to urea is between about 1:50 and 1:10.

---

This application is a continuation of copending application Ser. No. 712,385, filed Mar. 12, 1968, now abandoned.

Urea-formaldehyde resins, modified or not modified, have been prepared in the past and the method of manufacturing them has been described.

These resins find increasing utilization as adhesives for plywood, as foundry core binders, as paper additives, as resin extenders and the like. The ever increasing use of these resins in the industry makes it desirable to improve their quality and performance. When conventional urea-formaldehyde resins are used in the above mentioned applications, the performance at times leaves much to be desired. Particularly objectionable is the presence of free formaldehyde and consequently the objectionable odor. The free (unreacted) formaldehyde content of a conventional, commercially available urea-formaldehyde adhesive resin analyzes anywhere from 2.5 to 5.0 percent. As is well known, formaldehyde possesses a very pungent odor and is irritating to the mucous membrane of the nose and throat. In use—and particularly in hot press plywood operations—the conventional urea-formaldehyde adhesive evolves such a concentration of formaldehyde as to make it very disagreeable if not actually physically impossible to perform the necessary manual work associated with plywood manufacture. For this reason the lowest possible free formaldehyde content is desired in the resin.

Also objectionable is the lack of thermal stability. Other shortcomings will become apparent as this description proceeds.

It is therefore an object of this invention to provide a process for preparing novel stable urea-formaldehyde resins.

It is another object of this invention to provide a process for preparing novel urea-formaldehyde resins with superior thermal stability.

It is still another object of this invention to provide novel urea-formaldehyde resins, which are substantially devoid of free formaldehyde.

It is yet another object of this invention to provide novel urea-formaldehyde resins with light color.

And it is yet another object of this invention to provide novel urea-formaldehyde resins, which when used to produce plywood generate an excellent bond strength.

These and other objects and advantages of the present invention will become more apparent from the detailed description thereof set forth hereinbelow.

It has now been found that these objectives can be achieved by the addition of a phenolic compound at a degree of polymerization, which is substantially less than that desired for the final product.

The process according to this invention is carried out as follows:

Step (a): Urea and formaldehyde are heated in an aqueous solution in presence of an alkaline buffering agent including triethanolamine. The temperature can vary between about 75° C. and about 100° C. The preferred temperature ranges are from about 85° C. to about 95° C., while the optimum range is between about 88° C. and 92° C., because outstanding results are achieved therefrom. This heating is continued until a so-called "critical temperature" is reached. This "critical temperature" is defined as the temperature at which samples from the reaction mixture show a precipitate upon cooling.

Albeit this reaction is not completely clear, it can be assumed that methylol-ureas are formed as condensation products. These methylol-ureas begin to precipitate, when samples from the reaction mixture are cooled. The greater the extent of methylol-urea formation, the higher is the temperature at which methylol-ureas begin to precipitate from the solution. It can easily be seen that, for the same degree of methylol-urea formation, a high solids—low water resin will exhibit a higher critical solution temperature than will a low solids—high water resin. It has been determined empirically that the "critical temperature" ranges from about 50° C. to about 70° C. The preferred range however, is between about 60° C. and about 65° C. because superior results are achieved therefrom.

The molar ratio of formaldehyde to urea is from about 1.7 to about 2.5 per one mol of urea, with a preferred range of about 1.85 to about 2.1 per one mol of urea on account of outstanding results achieved therefrom.

As the buffering agent, trisodium phosphate, phosphoric acid and triethanolamine are successfully used, wherein the triethanolamine is utilized to adjust the pH upwards if down drifting occurs during the condensation.

Step (b): After the "desired" degree of condensation has been achieved, the reaction mixture is acidified by means of diluted sulfuric acid to a pH below 6 and heating is continued at a temperature ranging from about 75° C. to 100° C. However, because outstanding results are achieved, temperatures ranging from about 85° C. to about 95° C. are preferred, while optimum temperatures are between about 88° C. and 92° C.

During this heating period under acidic conditions polymerization takes place. This polymerization is continued until a "degree of polymerization" is achieved which is substantially less than that desired for the final product.

The "degree of polymerization" is empirically measured by determining the viscosity of the resin solution. This is preferably done with the Gardner viscosity comparison tubes.[1] Those familiar with this type of art will Preparation of phenol-modified urea-formaldehyde resin will vary depending on the desired concentration of the final product, whether water must be removed from or added to the system to achieve the desired concentra-

---

[1] Manufactured by Gardner Laboratories, Bethesda, Md.

tion, whether the starting formaldehyde solution does or does not contain methanol and whether a thin or viscous final product is required.

Step (c): At the point when the desired "degree of polymerization" has been reached the phenolic compound is added and heating is continued until the specified viscosity is reached, as typified in "Example A" below. At this point an alkali, preferably triethanolamine is added to render the acidic solution alkaline and thereafter it is cooled. The product is then suitable for its intended use. The temperature range, used in this step, varies from about 75° C. to about 100° C. However, the preferred range is between about 85° C. and about 95° C., because outstanding results are achieved therefrom.

The major requirement affecting the point or time of addition of the phenolic compound is that it must have at least a minimum time to react with the formaldehyde and/or methylolureas under acidic conditions before the reaction or polymerization is terminated. The minimum time is thirty (30) minutes; the maximum time is that required to polymerize or condense the urea and formaldehyde to a resin having a predetermined final viscosity. Thus, production of a low viscosity resin requires only a short period of 30–60 minutes of condensation under acidic conditions. In this case the phenolic compound would need to be charged with or at the same time as the acid required to produce the "acidic conditions." On the other hand, if a high viscosity resin is to be produced, a longer condensation period—up to 3–4 hours—will be required. In this case the phenol could be charged after the condensation is half completed and still have more than the 30 minutes minimum reaction time required.

The phenolic compound employed in this invention may include the group of phenol, cresols, xylenols, tertiary butyl phenol, dibutyl phenol, octyl phenol, dioctyl phenol, nonyl phenol, dinonyl phenol, dodecyl phenol and the like. However, the preferred phenolic compound is phenol on account of the outstanding performance achieved therefrom.

The amount of the phenolic compound to be added is related to the starting formaldehyde/urea ratio. The amount of phenol should be selected so that the mols of formaldehyde divided by the sum of the mols of urea plus mols of phenol lies between about 1.7 and about 2.0 with a preferred range of about 1.85–1.95. An additional proviso is that the molar ratio of phenol to urea must be between about 1:50 and 1:10.

In the above description and the examples to follow the term "formaldehyde" as employed herein is intended to include formaldehyde as a solution as well as concentrated urea-formaldehyde solution. The "commercial urea-formaldehyde solution" employed in Examples A and B is manufactured by Reichhold Chemicals, Inc., White Plains, N.Y., and distributed under the name 21–400 Agramine (concentrate). This material contains approximately 60% formaldehyde, 25% urea and 15% water plus methanol.

It can easily be seen that the concentration of the "aqueous solution" varies depending on the concentration of the formaldehyde solution used and the desired concentration of the finished product. If, for example, formaldehyde in the form of a commercial 37% solution is employed, the final product will be very dilute unless water is removed as by distillation during the process. On the other hand, if formaldehyde in the form of commercially available concentrated urea-formaldehyde solution is employed, it may be necessary to add water in order to carry out the process and to produce the desired product.

In order that the present invention may be more fully understood, the following Example A is given primarily by way of illustration rather than by way of limitation. Example B hereinbelow describes the preparation of a conventional unmodified urea-formaldehyde resin and is given primarily to demonstrate the objectives and advantages derived from this invention as set forth in Example A as compared with the shortcomings of the resin prepared according to Example B.

Tables 1, 2 and 3 below illustrate the evaluation data of the resins from Examples A and B.

EXAMPLE A

Preparation of phenol-modified urea-formaldehyde resin

Into a suitable reaction vessel, provided with thermometer and means for heating, cooling, and stirring the contents, are charged the following materials.

| | Grams |
|---|---|
| Commercial urea-formaldehyde solution | 2,000 |
| Water | 1,160 |
| Methanol | 571 |
| Trisodium phosphate | 3.4 |
| Phosphoric acid (85% by weight $H_3PO_4$) | 9.7 |
| Triethanolamine | 10.0 |
| Urea | 675 |

This charge was heated at a uniform rate from room temperature to 90° C. over a period of one (1) hour.

At a temperature of 90° C., it was found that the pH of the mixture had drifted downward from 6.90 to 6.65 pH units, consequently 5.0 grams of triethanolamine were added to the charge.

Sixty-eight (68) minutes after starting to heat the batch, it was found that the batch had a critical solution temperature of 60° C. At this point there was charged to the batch a total of 95.0 grams of diluted sulfuric acid (20 parts by volume water to 1 part by volume of 93% sulfuric acid). This acid reduced the batch pH to 5.7 pH units. Polymerization of the batch started as soon as the dilute acid was added.

The temperature of the batch was maintained at 90°, and the viscosity of the batch was determined at intervals. Thirty-five (35) minutes after the start of the acid addition, the batch was determined to have a "K" viscosity when a sample of the batch was compared with the series of Gardner letter viscosity standards. At this point 350 grams of phenol were added to the batch.

Temperature of the batch was maintained at 90° C., and the viscosity of the batch was determined at intervals. Thirty-five (35) minutes after starting to charge the penol it was determined that the batch had a "T" viscosity on the Gardner scale. At this point 34.0 grams of triethanolamine were charged to the batch to neutralize the acidity and thus to stop the polymerization. The batch was quickly cooled to ambient temperature. When submitted to analysis, this batch contained 64.9% of resin solids, 0.0% of free formaldehyde.

EXAMPLE B

Preparation of conventional urea formaldehyde resin

To a suitable reaction flask equipped with agitator, thermometer, and means of heating and cooling, there was charged 11,500 grams commercial urea-formaldehyde, 2,025 grams water, 4,261 grams urea, 895 grams methanol, 6.1 grams phosphoric acid, 7.2 grams trisodium phosphate.

The pH of the batch was 5.6. Subsequently 28 gm. triethanolamine were added. The pH rose to 7.7 and was then adjusted to 7.4 using 0.6 gm. formic acid diluted with 6 gm. water. The batch was then heated to 90° C. within 55 minutes. The critical temperature of 50° C. was reached 10 minutes after the batch had a temperature of 90° C.

Thereafter the batch was acidified with 4.1 gms. of formic acid to a pH of 5.9 and held at 90° C. at that pH until viscosity increased from Gardner letter viscosity "C–D" to "U" over a period of 4 hours and 45 minutes. The batch was then immediately neutralized to a pH of 7.5 using 60 gm. triethanolamine. After neutralizing 190 gm. of urea were charged to reduce final free formaldehyde from 4.2% to 2.6%.

TABLE I.—PERFORMANCE DATA

This table illustrates the values of the bond strength expressed in percentage of wood failure.

|  | Hot press [1] | | Cold press [1] | |
| --- | --- | --- | --- | --- |
|  | Conventional UF resin [2] | Phenol-modified UF resin | Conventional UF resin | Phenol-modified UF resin |
| Dry shear results [3]: | | | | |
| Percent wood failure | 100 | 98 | 92 | 87 |
| Tensile strength, lbs./in.² | 533 | 552 | 463 | 501 |
| Soak shear results: | | | | |
| Percent wood failure | 66 | 80 | 52 | 53 |
| Tensile strength, lbs./in.² | 528 | 559 | 404 | 442 |
| Soak test, cycles | 15 | 15 | 15 | 15 |
| Working (pot) life: | | | | |
| At 77° F., hours | 24+ | 24+ | 1.5 | 1.75 |
| At 110° F., hours | 5½ | 5+ | 1.0 | 1.0 |

[1] The following adhesive formulation was used and press conditions maintained in the performance of the evaluation test:

ADHESIVE FORMULATION

|  | Hot press | Cold press |
| --- | --- | --- |
| Resin, grams | 1,000 | 1,000 |
| Wheat flour, grams | 650 | 650 |
| Catalyst, grams | 104 | 26 |
| Water | (a) | (a) |

Press conditions

|  | Hot press | Cold press |
| --- | --- | --- |
| Plies | 3 | 3 |
| Pressure, p.s.i. | 200 | 200 |
| Temperature, ° F. | 250 | (b) |
| Assembly time, min | 10 | 15 |
| Press time, min | 3 |  |
| Aging, hrs. at 110° F. |  | 12 | a As needed.
b Ambient.
[2] UF resin means urea-formaldehyde resin.
[3] The tests cited in above Table I are defined as follows.

Dry Shear Tensile.—The longitudinal tensile force, in pounds, acting on one square inch of a 1 x 3-inch specimen of plywood that has been notched in such a way that the force is applied to a single ply of the veneer comprising the plywood.

Dry Shear Wood Failure.—That fraction expressed as a percentage of the square inch of the sheared specimen (see above, wherein rupture of failure has occurred in the wood ply rather than in the adhesive film binding the wooden plies comprising the plywood. This evaluation is strickly visual and requires some experience.

Soak Shear.—Same as the dry shear tensile and wood failure except that the tests are applied to test specimens that have been soaked in water at 25° C. for forty-eight (48) hours and dried at 110–120° F. for twenty-four (24) hours prior to testing.

Soak Test.—Plywood specimens, 6 x 6 inches square, are soaked in water at ambient temperature for four (4) hours and are then air dried at ambient temp. for twenty (20) hours. After this, the specimen is examined for evidence of delamination. This procedure constitutes one cycle of test and is repeated on successive days to a maximum of fifteen (15) cycles (days) or until the specimen shows more than 2 inches of delamination that extends ⅛-inch or more into the specimen.

Working Pot Life.—This is the length of time that the adhesive formulation remains usable, that is, remains thin enough to permit spreading a uniform film of glue on the sheets of veneer that are subsequently assembled to form the plywood. The point at which the glue or adhesive becomes too thick or viscous to be usable is determined visually and is based on experience. Samples of the glue or adhesive for this test are maintained at two temperatures (77° F. and 110° F.) that approximately correspond to the extremes of actual mill conditions.

TABLE II

This table illustrates the percentage of free formaldehyde in the final resins.

Conventional UF resin—2.5–5% free formaldehyde
Phenol modified UF resin—0.0% free formaldehyde The free formaldehyde content of a urea-formaldehyde resin is determined by reacting at 0° C. a weighed sample of resin with an excess of neutralized sodium sulfite solution. This reaction liberates an amount of sodium hydroxide stoichiometrically equivalent to the formaldehyde in the resin sample. The amount of sodium hydroxide liberated is determined by titrating it immediately with a standard acid solution while still at 0° C. The titration should be completed in thirty (30) seconds. From the known strength of the acid solution and weight of resin sample, the formaldehyde content of the sample may be computed.

TABLE III

This table illustrates the thermal stability [1] of the resins.

Conventional UF resin—17 days to Z3 at 110° F.
Phenol modified UF resin—40–60 days to Z3 at 110° F.

To perform the test, a quart sample of the resin whose "as made" or initial viscosity is known is placed in a laboratory oven whose temperature is thermostatically controlled at 110±1° F. At three-day intervals, the viscosity of the heating sample is determined. The viscosity and corresponding number of days of storage of the sample are recorded. Eventually the stored sample exceeds Z3 viscosity. At this point the test is terminated and the exact number of days required by the sample to reach Z3 viscosity is determined by inspection or interpolation of the recorded data.

While the above describes the preferred embodiment of this invention, it will be understood that modifications or variations may be made therefrom within the scope of the specification and claims as will be apparent to those skilled in the art to which the invention pertains.

What is claimed is:

1. A process for preparing a reaction product of formaldehyde and urea in an aqueous methanol containing solution, substantially devoid of free formaldehyde which comprises: (a) heating formaldehyde and urea in an aqueous methanolic medium in the presence of an alkaline buffering agent including triethanol amine to a temperature of from about 75° C. to about 100° C. while maintaining a pH between 6.90 and 6.65, the quantity of formaldehyde varying from about 1.7 to about 2.5 mols per mol of urea, until a critical temperature of from about 50° C. to about 70° C. has been reached, said critical temperature being defined as the temperature at which precipitation occurs upon cooling (b) acidifying the resulting reaction product to a pH of about 5.7 and continuing to heat to a temperature from about 75° C. to about 100° C. for a period sufficient to effect partial polymerization at a viscosity of about K on the Gardner scale and (c) adding a phenolic compound at the end of step (b) and before complete polymerization is effected, said phenolic compound being selected from a group consisting of phenol and alkylated phenols and mixtures thereof, said alkylated phenols having from one to twelve carbon atoms in their alkyl chain, the quantity of said phenolic compound being selected in such a manner that the number of mols of formaldehyde divided by the sum of mols of urea and phenolic compound to urea is between about 1.7 and 2.0 and the molar ratio of phenol to urea is between about 1:50 and about 1:10, continuing heating under acid conditions to a temperature of about 90° C. for a period at least about 30 minutes

[1] Thermal stability of a resin is expressed as the number of days required for the viscosity of a sample stored at 110° F. to increase from the "as made" viscosity to a Gardner "Z3" viscosity. The specified temperature and terminal viscosity permit obtaining reproducible results that can be correlated with actual experience in the field.

to effect the desired degree of polymerization and finally terminating the reaction by addition of triethanolamine and cooling to ambient temperature, to produce a reaction product having superior thermal stability and bond strength and being substantially devoid of free formaldehyde.

2. A process for preparing a reaction product of formaldehyde and urea according to claim 1 wherein the temperature of step (a) is between about 85° C. and 95° C.

3. A process for preparing a reaction product of formaldehyde and urea according to claim 1 wherein the critical temperature of step (a) is between about 60° C. and about 65° C.

4. A process for preparing a reaction product of formaldehyde and urea according to claim 1 wherein the quantity of formaldehyde is between about 1.85 and about 2.1 mols per mol of urea.

5. A process for preparing a reaction product of formaldehyde and urea according to claim 1 wherein the temperature of step (b) is between about 85° C. and about 95° C.

6. A process for preparing a reaction product of formaldehyde and urea according to claim 1 wherein the phenolic compound is phenol.

7. A process for preparing a reaction product of formaldehyde and urea according to claim 1 wherein the quantity of the phenolic compound is selected in such a manner that the number of mols of formaldehyde divided by the sum of mols of urea and phenolic compound is between about 1.85 and about 1.95.

8. An improved phenol modified reaction product of formaldehyde and urea prepared by the process of claim 1 having superior thermal stability and bond strength and being substantially devoid of free formaldehyde.

References Cited
UNITED STATES PATENTS

| | | | |
|---|---|---|---|
| 1,678,024 | 7/1928 | Terwilliger | 260—51.5 |
| 2,500,054 | 3/1950 | Anthony et al. | 260—840 |

WILLIAM H. SHORT Primary Examiner

HOWARD SCHAIN, Assistant Examiner

U.S. Cl. X.R.

156—331, 335; 161—262; 260—7, 38, 51.5, 840